Dec. 15, 1970  G. M. BROOKS  3,546,966
ANTENNA ROTOR

Filed March 29, 1968  2 Sheets-Sheet 1

INVENTOR.
GEORGE M. BROOKS
BY
Hopgood & Calimafde
ATTORNEYS

Dec. 15, 1970  G. M. BROOKS  3,546,966
ANTENNA ROTOR

Filed March 29, 1968

INVENTOR.
GEORGE M. BROOKS

BY
Hopgood & Calimafde
ATTORNEYS

United States Patent Office 3,546,966
Patented Dec. 15, 1970

3,546,966
ANTENNA ROTOR
George M. Brooks, Sherburne, N.Y., assignor to Jerrold Electronics Corporation, Philadelphia, Pa., a corporation of Delaware
Filed Mar. 29, 1968, Ser. No. 717,294
Int. Cl. F16h 33/00; H01q 3/02
U.S. Cl. 74—640                      1 Claim

ABSTRACT OF THE DISCLOSURE

An improved antenna rotor with a stationary lower housing and a rotating upper housing. A direct current motor disposed in the lower housing drives the upper housing through a dual staged harmonic drive. A hollow centered wave generator permits a control communication between the stationary and rotating housings, and the circular splines of the harmonic drive constitute a rotational thrust bearing between the upper and lower housings of the rotor.

BACKGROUND

The invention is in the field of remotely controlled electrically powered antenna rotors having particular application to mast mounted rotors for television antennas.

Electrically powered antenna rotors are known to be used to rotate roof-top mast mounted antennas. Most of such known rotors employ an alternating current drive motor and a conventional gear train to drive the rotating section of the housing. Because such units are located in inaccessible areas and generally exposed to the weather elements, reliability of such units is a continuing concern.

Conventional gear trains and A.C. drive motor combinations used in such units have evidenced shortcomings. For example, the gear trains may suffer loss of lubrication, wear, and occasional material failure due to high loads.

Another problem encountered with prior art rotors is that most of such known rotors employ A.C. electric motors as a source of drive power. The A.C. motors suffer loss of torque at peak loads, resulting in rotor stall or failure.

The use of the harmonic drive as the transmission means for the rotor, while offering many advantages, gave rise to a novel problem. As the rotor of the invention has divided its control and drive means between the rotating stationary housings, it is necessary that control means communicate between the upper and lower housing. Furthermore, because of the relative rotation between the upper and lower housings, it is desirable to have such communication means pass through the center of the housing.

It is, therefore, an objective of the invention to provide an antenna rotor with a harmonic drive assembly which has an open access through an interior wave generator.

It is a further objective of this invention to provide a rotor power drive assembly in which the drive and thrust bearings are combined.

Another objective of this invention is to provide a rotor power drive with greater mechanical advantage and increasing torque with increasing load.

It is still another further objective of this invention to provide a gear drive for antenna rotors which is self-lubricating, stronger and subject to less wear.

SUMMARY

A device for driving remotely located antenna rotors comprised basically of an upper rotor housing and a lower stationary housing, a direct current electrical power source disposed in the lower housing to drive the upper housing through a harmonic gear train. The wave generator of the harmonic gear train is hollow to permit the passage of control elements between the upper and lower housing.

The harmonic drive as herein employed incorporates a two-stage flexible drive spline (flexspline), which meshes with two adjacent rigid circular splines coupled, respectively, to the upper and lower elements of the antenna rotor. The adjacent circular splines constitutes a thrust bearing between the upper and lower elements of the rotor. The flexspline is actuated by a spaced-roller wave generator which is in turn driven by an internally splined hollow cylinder or ring.

The hollow wave generator assembly of the invention provides for the passage of control wires and sensing elements from the lower stationary housing containing the motor to the upper rotating housing containing rotational sensing means responsive to the relative rotation between the housing sections. This passage is through the vertical axial center of the rotor housings which reduces relative motion between the upper and lower terminals of the control elements to rotational motion alone. The availability of this central communicating channel facilities measurement of rotation of the upper housing as hereinafter explained.

The harmonic drive as herein embodied gives the advantages of a combined drive and thrust bearing to the rotor. No radial thrust is generated between the upper and lower circular splines as they are acted upon by a common interior flexspline, and the circular splines as incorporated in the rotor of the invention provide a thrust bearing between the stationary and rotating elements thereof.

Another advantage of the invention is that it has virtually no backlash within the gear train. Absence of such backlash results in greater precision in control of the position of the antenna.

Other objectives, advantages, and various further features of novelty and invention will be pointed out or will occur to those skilled in the art from a reading of the following specification in conjunction with the accompanying drawings.

A further advantage stemming from the use of the harmonic drive in the rotor is that the resulting power train is self-locking, eliminating the need for an additional braking mechanism.

The use of a D.C. motor with an antenna rotor has been made possible largely by the development of an effective control circuit for such a motor. Such a control circuit is disclosed in an application Ser. No. 704,633 filed by Sergi L. Tichnor, entitled "Solid State Motor Driven Antenna Rotator Control Circuit," filed on Feb. 12, 1968. The primary advantage gained by the use of a D.C. motor is increased power output, in the form of increased torque with increased load. This increased torque coupled with the high mechanical advantage of the harmonic drive as herein embodied results in an antenna rotor drive of exceptional strength, which contributes to responsiveness and reliability.

Other objectives, advantages, and various further features of novelty and invention will be pointed out or will occur to those skilled in the art from a reading of the following specification in conjunction with the accompanying drawings.

DETAILED DESCRIPTION OF THE DRAWINGS

Figure 1:
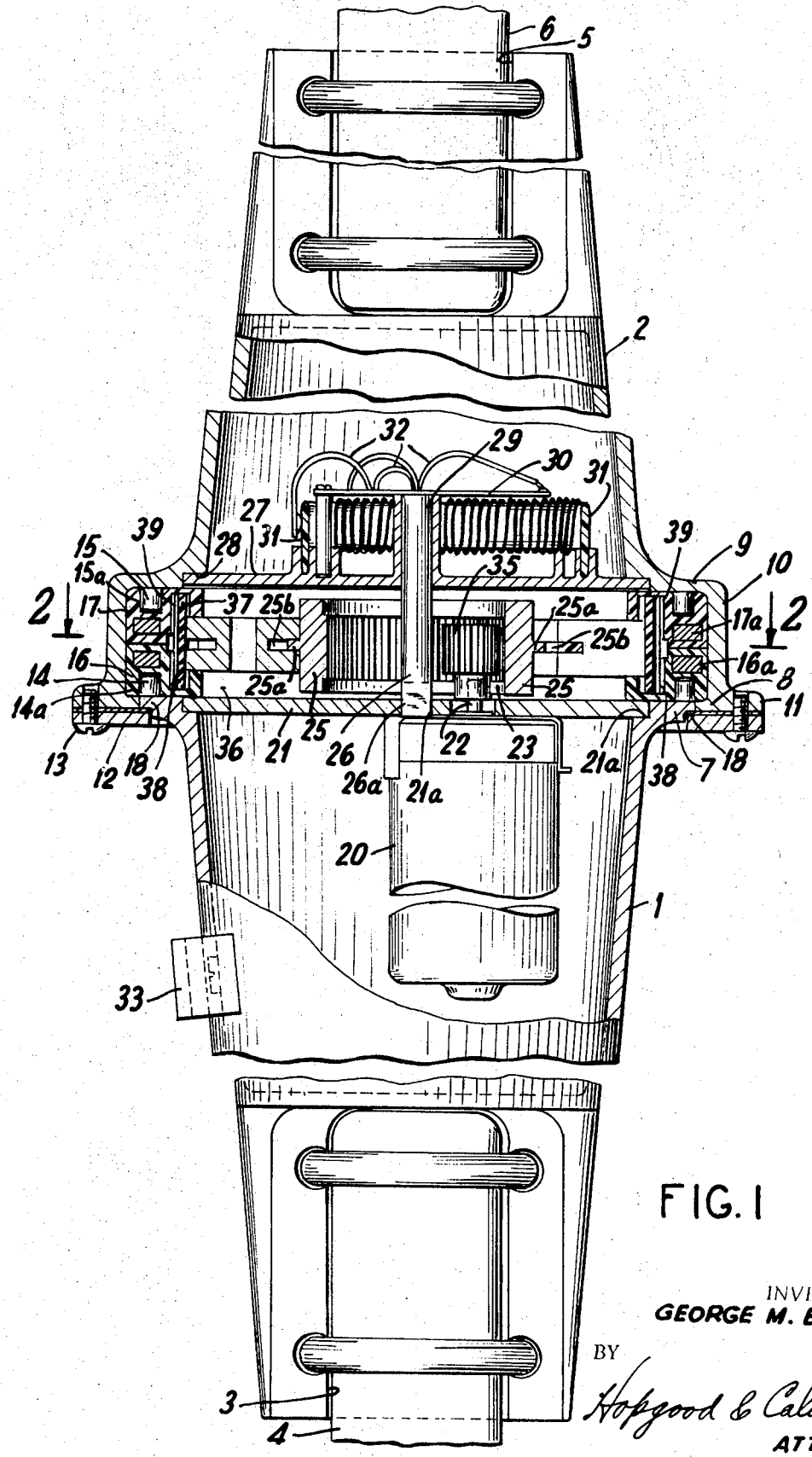
FIG. 1 is a vertical cross-sectional view of the rotor of the invention.

Referring now to FIG. 1, the rotor housing is comprised generally of a lower stationary housing 1, and a rotating upper housing 2. Lower section 1 has a recess 3 in the bottom thereof to receive the upper end of a supporting mast 4. A similar recess 5 is provided in the upper end of rotating housing 2 to receive an antenna support mast 6.

Housings 1 and 2 are basically cylindrical, but flair outwardly toward the center where they are rotatably connected as will be described. Lower housing 1 flairs upwardly to a flanged section 7 which provides a supporting surface for the lower circular spline 16 of a harmonic gear drive.

The lower end of upper housing 2 flairs into a flanged section 9 which opposes flanged housing 7 of lower section 1, and provides a supporting surface for the upper circular spline 17 of the harmonic gear drive. A cylindrical skirt 10 extends from flanged housing 9 to enclose flanged section 7 of lower housing 1 when the rotor is assembled. Skirt 10 terminates in a flange 11 to which an annular retaining plate 12 is secured by screws 13.

Two series of spline retaining pins 14 and 15 extend from flanged sections 7 and 9 respectively. These pins fit into recesses 14a and 15a in the surfaces of circular spline elements 16 and 17 which lie adjacent to flanged sections 7 and 9.

An annular recess 18 in bottom peripheral edge of flanged section 7 provides a bearing surface 17 for retaining plate 12. Retaining plate 12 extends radially inwardly into channel 18 and prevents separation of upper and lower housings 1 and 2 of the rotor.

A D.C. drive motor 20 is mounted to a disk-shaped plate 21 which encloses the upper end of stationary section 1 of the rotor. The drive shaft 22 of motor 20 extends through a cylindrical recess 23 in plate 21.

Plate 21 is fitted into an annular recess 21a in the inside peripheral edge of flanged section 7 of stationary section 1, and is retained and sealed thereto.

Figure 2:
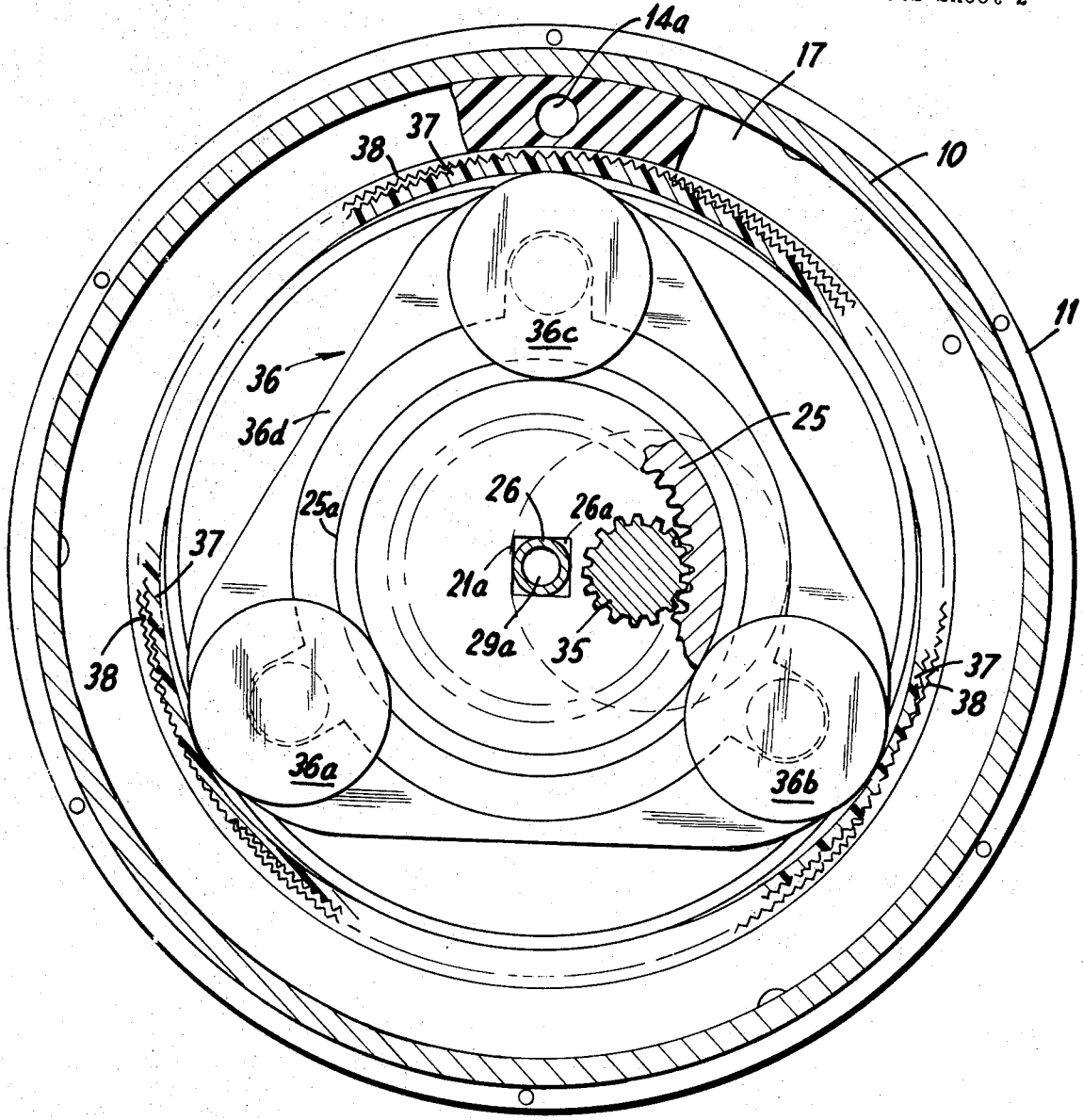
FIG. 2 is a horizontal cross-sectional view of the drive mechanism of the invention.

The harmonic gear train employed by the invention includes a cylindrical internal spline or ring 25 to drive the wave generator 36 (see FIG. 2). Motor 20 is offset from the center of stationary housing 1 to permit drive gear 35 to engage spline 25. This configuration leaves the center area of the rotor open as illustrated in FIGS. 1 and 2, for the passage of shaft 26 and electrical control wires as hereinafter described.

Rotating housing 2 is enclosed at its lower end in a manner similar to stationary housing 1. A disk-shaped cover plate 27 is sealed into annular recess 28 in the inside peripheral edge of flanged section 9. Cover plate 27 also constitutes the base of a spiral potentiometer employed in the control circuitry of the rotor. This spiral potentiometer is described more fully in a U.S. patent application Ser. No. 696,887, now Pat. No. 3,484,733, filed by George M. Brooks, Jan. 10, 1968 and entitled "Constant Pressure Probe for Nonlinear Potentiometer."

A hollow shaft 26 extends through cover plate 21, through the open center of spline 25, and up through bore 29 in cover plate 27. A probe contact 30 of the control potentiometer is rigidly attached to the top of shaft 26. The bottom end of shaft 26 is square and fits into a square aperture 21a in cover plate 21 when the rotor is assembled. Coil 31 of the potentiometer is mounted upon the inside of cover plate 27, so that in operation, coil 31 is the moving element of the potentiometer, moving with rotating housing 2 in response to actuation of the rotor. Shaft 26 is prevented from rotating by the engagement of its square end 26a in aperture 21a.

The control wires 32 associated with the control circuit and the potentiometer are lead through bore 29a in shaft 26 to a terminal 33 on the side of stationary housing 1.

The rotating upper housing 2 is driven by D.C. motor 20 through a dual stage harmonic gear drive. A drive gear 35 is attached to drive shaft 22 of motor 20 and engages the inside of an internal cylindrical spline 25 at a speed reduction ratio of 2 to 1.

A spaced roller wave generator 36 is disposed in contact with spline 25. The wave generator 36 (see FIG. 2) employed by the invention has three rollers, 36a, b and c, supported by a web 36d. An annular ridge 25a extending around the outside center of spline 25 engages complementary annular grooves 25b around the outside center of rollers 36a, b and c, to center the wave generator.

The flexible spline 37 of the harmonic gear has two parallel annular sets of teeth 38 and 39 around its exterior surface, which engage circular splines 16 and 17, respectively, at the points where flexspline 37 is in contact with wave guide rollers 36a, b and c. Circular splines 16 and 17 are axially coextensive, and are commonly engaged by flexspline 37. As there are no radial forces created to disturb the axial alignment of splines 16 and 17, no drive bearing between sections 1 and 2 of the housing is required.

Spline 16 being attached to the lower housing 1 is stationary so that the rotation of flexspline 37 will cause circular spline 17 to rotate in the opposite direction. Teeth ratios of 323:320 for teeth set 38 and spline 16, and 243:240 for teeth set 39 and spline 17, provide a speed reduction ratio of 2500:1. This reduction plus the 2:1 reduction between drive gear 35 and spline 25 provide an overall speed reduction of 5000:1 for the unit. Although other reduction ratios may be utilized, the above reduction ratio has been found to be advantageous, in that it provides great strength and enables very precise control of the position of the antenna.

Circular splines 16 and 17 are rigid, being comprised of an inner metal ring 16a and 17a respectively around which a self-lubricating material is molded. Splines 16 and 17 are prevented from rotating with regard to their respective housing sections 1 and 2 by pins 14 and 15 which engage recesses 14a and 15a when the splines are installed in the housing as illustrated in FIG. 1. So mounted they constitute a thrust bearing surface between sections 1 and 2 of the rotor housing. Although circular splines 16 and 17 can be made of any suitable material, it has been found that Du Pont Delrin possesses qualities of strength and self lubrication which contribute to greater efficiency and longer life of the subject gears, and to their additional bearing function.

Motor 20 is reversible, permitting rotation of the rotor in either direction. The position of the rotor at any instant is fed into its control circuit by the location of probe contact 30 on spiral coil 31. The spiral potentiometer, as described in the aforementioned copending application, permits rotation of the rotor a full 360°, facilitating the pointing of the antenna in any direction.

While the principles of the invention have been described in connection with the above specific apparatus, it is to be clearly understood that this description is made only by way of example and not as a limitation to the scope of the invention as set forth in the accompanying claim.

I claim:
1. An antenna rotor comprised of:
a lower stationary housing including means to affix said lower housing to an antenna mast;
an upper rotating housing including means to affix an antenna thereto;
a drive motor mounted within said lower housing;
a multistage harmonic drive coupling said motor to said upper housing, including a first circular spline nonrotatably connected to said upper rotating housing and a second circular spline nonrotatably connected to said lower stationary housing wherein said splines comprise a thrust bearing between said upper and lower housings, and a flexible spline engaged with said first and second circular splines;
an internal spaced-roller wave generator having an internally splined drive ring, and a drive gear in engaged relationship with the internal spline on said drive ring, the interior diameter of said drive ring being greater than twice the diameter of said drive gear so as to leave an opening through the center of said ring;
and wherein said rotor further comprises rigid structural means to measure the rotational position of said upper housing with respect to said lower housing, which means is attached to said lower housing and passes through the center opening of said ring into said housing.

References Cited

UNITED STATES PATENTS

| | | | |
|---|---|---|---|
| 2,512,682 | 6/1950 | Salinger et al. | 343—882X |
| 2,581,123 | 1/1952 | Merkle | 343—882X |
| 2,682,609 | 6/1954 | Wampler | 343—882X |
| 2,966,811 | 1/1961 | Sundt | 343—882X |
| 3,214,999 | 11/1965 | Lapp | 74—640X |
| 3,374,372 | 3/1968 | Tinder et al. | 74—640X |

WILLIAM L. FREEH, Primary Examiner

U.S. Cl. X.R.

343—882